United States Patent
Choi et al.

(10) Patent No.: US 11,656,491 B2
(45) Date of Patent: May 23, 2023

(54) METHOD AND APPARATUS FOR CONTROLLING TEMPERATURE FOR OPTICAL MODULATOR

(71) Applicant: UIF (University Industry Foundation), Yonsei University, Seoul (KR)

(72) Inventors: Woo Young Choi, Seoul (KR); Min Kyu Kim, Seoul (KR); Min Hyeong Kim, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 117 days.

(21) Appl. No.: 17/185,555

(22) Filed: Feb. 25, 2021

(65) Prior Publication Data

US 2021/0271127 A1  Sep. 2, 2021

(30) Foreign Application Priority Data

Feb. 28, 2020  (KR) .......................... 10-2020-0024799

(51) Int. Cl.
*G02F 1/1333* (2006.01)
*G02F 1/01* (2006.01)

(52) U.S. Cl.
CPC ...... *G02F 1/133382* (2013.01); *G02F 1/0123* (2013.01); *G02F 1/0147* (2013.01)

(58) Field of Classification Search
CPC .... G02F 1/0553; G02F 1/3515; G02F 1/0126; G02F 1/133385; G02F 1/0147; G02F 1/0123; G02F 1/133382
See application file for complete search history.

(56) References Cited

U.S. PATENT DOCUMENTS

| | | | |
|---|---|---|---|
| 9,933,639 B1 | 4/2018 | Lin et al. | |
| 2008/0018903 A1* | 1/2008 | Bao | G01L 1/242 374/E11.015 |
| 2012/0205526 A1* | 8/2012 | Iwanaga | H04B 10/40 359/237 |

FOREIGN PATENT DOCUMENTS

| JP | 2009003454 A | 1/2009 |
|---|---|---|
| KR | 20100066803 A | 6/2010 |
| KR | 20190046519 A | 5/2019 |

OTHER PUBLICATIONS

Min-Hyeong Kim, et al., "A Temperature Controller IC for Maximizing Si Micro-Ring Modulator Optical Modulation Amplitude", Journal of lightwave tech. Feb. 15, 2019, vol. 37, No. 4.

* cited by examiner

*Primary Examiner* — Christopher Stanford
*Assistant Examiner* — Journey F Sumlar

(57) ABSTRACT

Disclosed are a temperature control method of an optical modulator and an apparatus therefore. The temperature control apparatus of an optical modulator according to an exemplary embodiment of the present disclosure is to provide a temperature control method of an optical modulator which performs a calibration mode to select a heater control voltage with a maximum optical modulation amplitude (OMA) while adjusting a heater control voltage which drives a heater of the optical modulator, stores a reference temperature measurement code based on a measured temperature value of the optical modulator while driving the heater at a selected heater control voltage, and performs a lock mode which controls a temperature of the optical modulator by changing the heater control voltage using the reference temperature measurement code after stopping the optical modulation amplitude detecting operation and an apparatus therefor.

11 Claims, 8 Drawing Sheets

METHOD AND APPARATUS FOR CONTROLLING TEMPERATURE FOR OPTICAL MODULATOR

CROSS-REFERENCE TO RELATED APPLICATIONS

This application claims priority to and the benefit of Korean Patent Application No. 10-2020-0024799 filed in the Korean Intellectual Property Office on Feb. 28, 2020, the entire contents of which are incorporated herein by reference.

TECHNICAL FIELD

The present disclosure relates to a method for controlling a temperature of an optical modulator and an apparatus therefor.

BACKGROUND ART

The contents described in this section merely provide background information on the exemplary embodiment of the present disclosure, but do not constitute the related art.

Recently, in accordance with artificial intelligence and 5-th generation mobile communication techniques, an amount of data handled by various IT systems such as services which require transmitting a large amount of data is astronomically increasing. Accordingly, attempts and demands to apply long-distance optical communication interconnect of the related art which is capable of transmitting large amounts in a short time as a short distance interconnect are increasing. In order to complete optical communication interconnect, an optical modulator which converts an electrical signal into an optical signal is necessary at a transmission end. Among the optical modulators, a ring type modulator is small and is appropriate for wavelength division multiplexing (WDM) and is very appropriate for high speed communication so that the ring type modulator is being actively studied and used.

Figure 1:
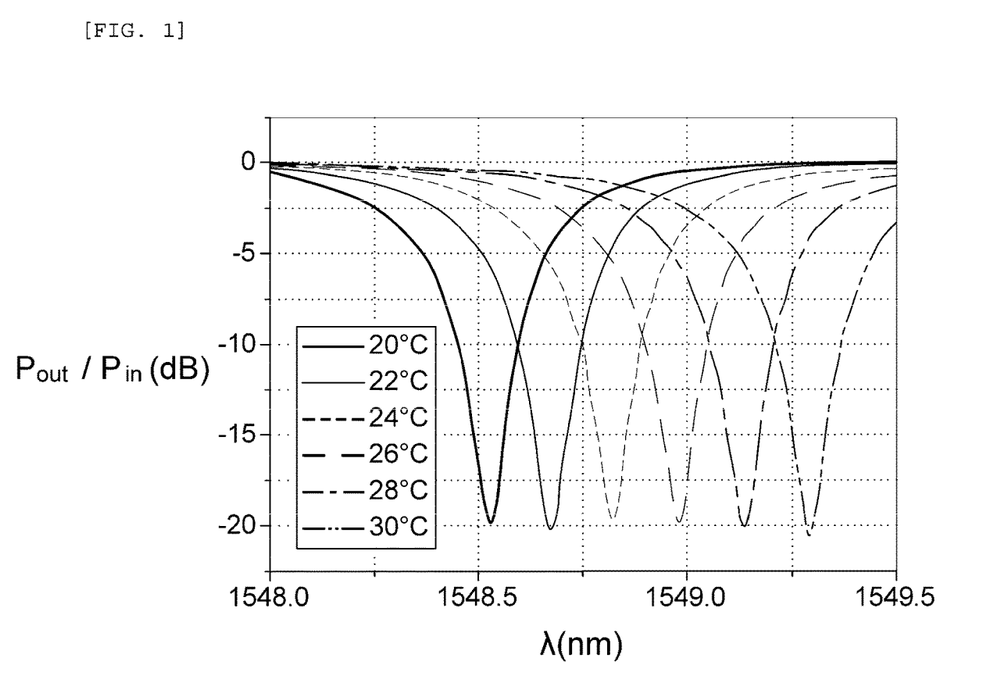
FIG. 1 is an exemplary diagram illustrating a characteristic curve according to temperature change of a general optical modulator.

However, as illustrated in FIG. 1, in such an optical modulator, as a characteristic curve is changed due to the temperature, the quality of communication data is degraded. Accordingly, a temperature control circuit which controls a temperature of the optical modulator is essential for the productivity of the optical modulator.

Specifically, most of existing methods which have been studied to implement a temperature compensation circuit for a ring type optical modulator find a maximum optical modulation amplitude (OMA) while directly monitoring an optical modulation amplitude of the modulated optical signal, that is, a modulation size. However, according to the existing method, there is a disadvantage in that a reference corresponding to an amplitude value with a maximum optical modulation amplitude needs to be taken from the outside or a power consumption of a block which requires to find an amplitude value with the maximum optical modulation amplitude (OMA) is very severe. The power consumption is proportionally increased as the transmission speed is increased so that it is difficult to design a low power circuit. Therefore, a temperature control device which operates at a low power without receiving a reference for a maximum value of a desired optical modulation amplitude (OMA) from the outside is necessary.

SUMMARY

A main object of the present disclosure is to provide a temperature control method of an optical modulator which performs a calibration mode to select a heater control voltage with a maximum optical modulation amplitude (OMA) while adjusting a heater control voltage which drives a heater of the optical modulator, stores a reference temperature measurement code based on a measured temperature value of the optical modulator while driving the heater at a selected heater control voltage, and performs a lock mode which controls a temperature of the optical modulator by changing the heater control voltage using the reference temperature measurement code after stopping the optical modulation amplitude detecting operation and an apparatus therefor.

According to an aspect of the present disclosure, in order to achieve the above-mentioned object, a temperature control apparatus of an optical modulator includes a heater controller which is applied with a heater control code and outputs a heater control voltage generated based on the heater control code to control an operation of the heater; a measured temperature value converter which acquires a measured temperature value from the sensor and outputs a temperature measurement code obtained by converting the measured temperature value into a digital signal; an optical modulation amplitude detector which is applied with an electrical signal (current) for an optical signal modulated by the optical modulator, detects an optical modulation amplitude (OMA) based on the electrical signal, and outputs a detection signal corresponding to a detection result of the optical modulator amplitude (OMA); and a temperature controller which generates a heater control code based on the temperature measurement code and the detection signal and transmits the heater control code to the heater controller to control the temperature of the optical modulator.

According to another aspect of the present disclosure, in order to achieve the above-mentioned object, a temperature control method of an optical modulator includes a calibration mode performing step of detecting an optical modulation amplitude (OMA) by means of an optical modulation amplitude detecting operation by adjusting a heater control voltage in the unit of a predetermined voltage at the time of initial operation of the optical modulator to select a heater control voltage; and a lock mode performing step of storing a reference temperature measurement code based on a measured temperature value acquired from the sensor while driving the heater with the selected heater control voltage and controlling a temperature of the optical modulator after stopping the operation of detecting the optical modulation amplitude (OMA).

According to another aspect of the present disclosure, in order to achieve the above-mentioned object, a temperature control system includes: an optical modulation apparatus including an optical modulator which is applied with an optical source signal and a high-speed modulated voltage to perform modulation, a sensor which measures a temperature, and a heater which adjusts a temperature and a photo diode which converts and outputs the optical signal modulated by the modulator into an electrical signal; and a temperature control apparatus which selects a heater control voltage at which an optical modulation amplitude (OMA) is maximum by adjusting a heater control voltage in the unit of a predetermined voltage at the time of initial operation of the optical modulator, stores a reference temperature measurement code based on a measured temperature value acquired from the sensor while driving the heater with the selected heater control voltage, and controls the temperature of the optical modulator after stopping the operation of detecting the optical modulation amplitude (OMA).

As described above, according to the present disclosure, the temperature of the optical modulator may be controlled at a low power while detecting an optical modulation amplitude (OMA) without receiving a detection result of an optical modulation amplitude (OMA) from the outside.

Further, according to the present disclosure, the operation of monitoring the optical modulation amplitude (OMA) stops after detecting a maximum value of an initial optical modulation amplitude (OMA) to significantly reduce the power consumption for temperature control.

Further, according to the present disclosure, the temperature of the optical modulator may be controlled without consistently monitoring the optical modulation amplitude (OMA).

Further, according to the present disclosure, the temperature of the optical modulator may be controlled while minimizing the power consumption regardless of a data transmission speed.

BEST MODE FOR CARRYING OUT THE INVENTION

Hereinafter, exemplary embodiments of the present invention will be described in detail with reference to the accompanying drawings. In the description of the present disclosure, if it is considered that the specific description of related known configuration or function may cloud the gist of the present disclosure, the detailed description will be omitted. Further, hereinafter, exemplary embodiments of the present disclosure will be described. However, it should be understood that the technical spirit of the invention is not restricted or limited to the specific embodiments, but may be changed or modified in various ways by those skilled in the art to be carried out. Hereinafter, a temperature control method of an optical modulator and an apparatus therefor proposed by the present disclosure will be described in detail with reference to drawings.

Figure 2:
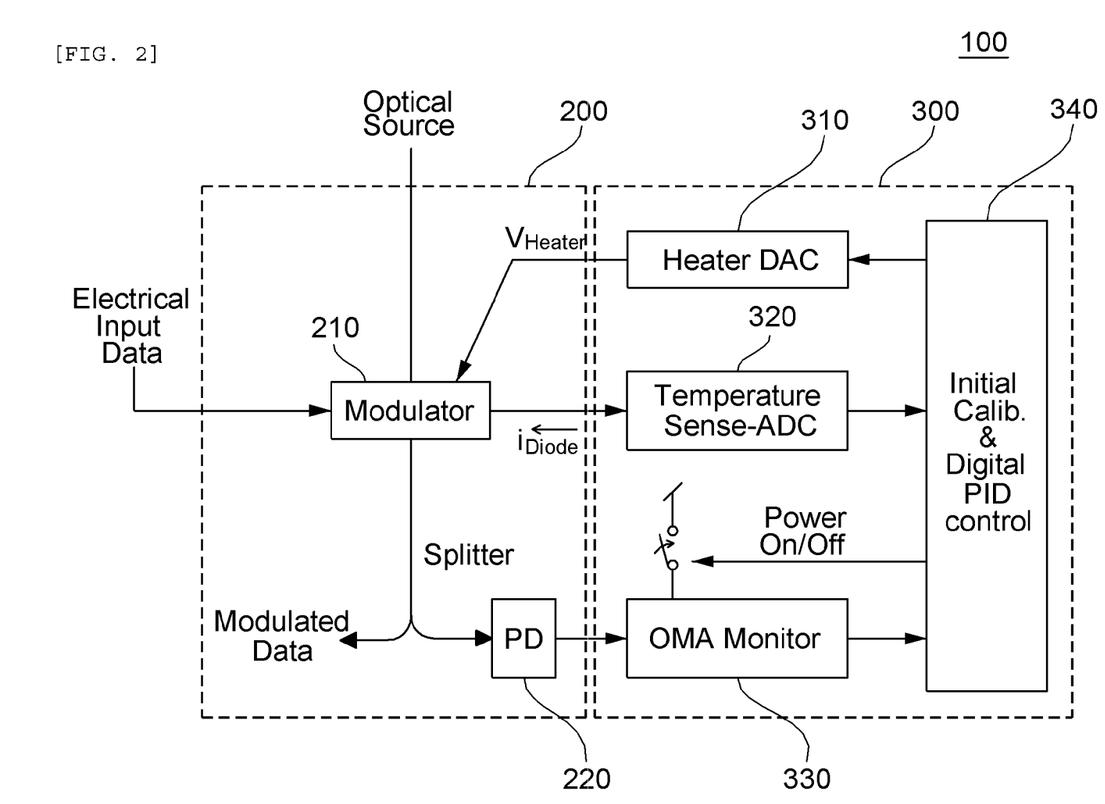
FIGS. 2 and 3 are block diagrams illustrating detailed configurations of a temperature control system and a temperature control apparatus of an optical modulator according to an exemplary embodiment of the present disclosure.
Figure 3:
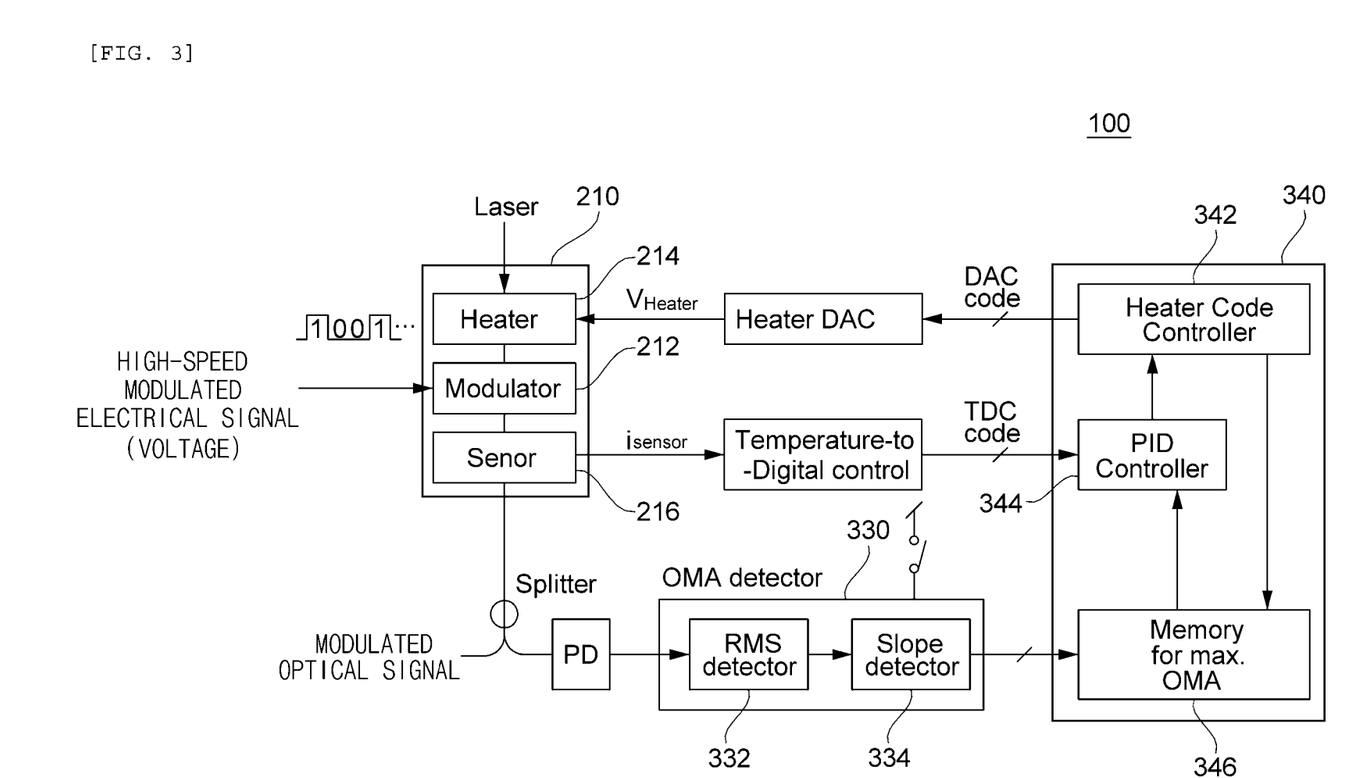

FIGS. 2 and 3 are block diagrams illustrating detailed configurations of a temperature control system and a temperature control apparatus of an optical modulator according to an exemplary embodiment of the present disclosure.

The temperature control system 100 according to the exemplary embodiment includes an optical modulation apparatus 200 and a temperature control apparatus 300.

Referring to FIG. 2, the optical modulation apparatus 200 includes an optical modulator 210 and a photo diode 220 and the temperature control apparatus 300 includes a heater controller 310, a measured temperature value converter 320, an optical modulation amplitude detector 330, and a temperature controller 340. Further, referring to FIG. 3, the optical modulator 210 includes a modulator 212, a heater 214, and a sensor 216 and the optical modulation amplitude detector 330 includes an RMS detector 332 and a slope detector 334. The temperature controller 340 includes a heater code controller 342, a signal controller 344, and a signal storage unit 346. The temperature control system 100 of FIGS. 2 and 3 is an exemplary embodiment so that all blocks illustrated in FIGS. 2 and 3 are not essential components and in the other exemplary embodiment, some blocks included in the temperature control system 100 may be added, modified, or omitted.

In order to maintain an optimal performance of the optical modulator 210 which modulates an optical source signal (a laser signal), the temperature control system 100 controls the heater of the optical modulator to maintain a maximum value of the optical modulation amplitude (OMA) and performs an operation of detecting the optical modulation amplitude (OMA) only until the maximum value of the optical modulation amplitude is found to minimize the power consumption for temperature control.

The optical modulation apparatus 200 includes an optical modulator 210 and a photo diode 220.

The optical modulator 210 is applied with the optical source signal and an electrical signal (voltage) which is high-speed modulated and performs an operation of modulating the electrical signal to an optical signal. Referring to FIG. 3, the optical modulator 210 includes a modulator 212 which is applied with the optical source signal and the high-speed modulated electrical signal (voltage) to perform modulation, a heater 214 which is configured by resistors to adjust the temperature of the optical modulator 210, and a sensor 216 which measures a temperature of the optical modulator 210.

Apart of an output which is output from the modulator 212 is transmitted to the photo diode 220 by a splitter.

The heater 214 is applied with a heater control voltage from the heater controller 310 of the temperature control apparatus 300 and operates in accordance with the heater control voltage.

The sensor 216 measures a temperature of the optical modulator 210 and transmits a measured temperature value $i_{sensor}$ for the measured temperature to the measured temperature value converter 320 of the temperature control apparatus 300. Here, the sensor 216 may transmit the measured temperature value $i_{sensor}$ for the temperature which is measured at a predetermined cycle or in real time to the measured temperature value converter 320.

The photo diode 220 performs an operation of converting an optical signal output from the optical modulator 210 into an electrical signal. The photo diode 220 may convert at least some data among the output from the optical modulator 210 into an electrical signal.

The temperature control apparatus 300 is interlinked with the heater 214 and the sensor 216 of the optical modulator 210 to perform an operation of controlling a temperature of the optical modulator 210.

The heater controller 310 is applied with a heater control code from the temperature controller 340 and generates a heater control voltage to control an operation of the heater 214 based on the heater control code. The heater controller 310 transmits the generated heater control voltage to the heater 214 to adjust a temperature of the optical modulator 210.

The measured temperature value converter 320 acquires a measured temperature value from the sensor 216 and converts the acquired measured temperature value into a digital signal.

The measured temperature value converter 320 outputs a temperature measurement code obtained by converting the measured temperature value into a digital signal. The measured temperature value converter 320 transmits the temperature measurement code obtained by converting the measured temperature value to the temperature controller 340.

The optical modulation amplitude detector 330 is applied with an electrical signal (current) for an optical signal which is modulated by the optical modulator 210 and performs an operation of detecting an optical modulation amplitude (OMA) based on the electrical signal. Here, the optical modulation amplitude detector 330 is applied with an electrical signal for the modulated optical signal from the photo diode 220.

The optical modulation amplitude detector 330 outputs a detection signal corresponding to a detection result of the optical modulation amplitude to the temperature controller 340. The optical modulation amplitude detector 330 outputs a detection signal corresponding to a detection result in which an optical modulation amplitude has a maximum value to the temperature controller 340.

Referring to FIG. 3, the optical modulation amplitude detector 330 includes an RMS detector 332 and a slope detector 334.

The RMS detector 332 is applied with an electrical signal (current) for an optical signal modulated by the optical modulator 210 and detects an effective voltage proportional to an effective value of the electrical signal.

The slope detector 334 detects a slope based on the detection result for the effective voltage and transmits a detection signal in which the optical modulation amplitude (OMA) has a maximum value to the temperature controller 340. The temperature controller 340 may select a heater control voltage or a heater control code when the optical modulation amplitude (OMA) has a maximum value, based on the detection signal.

The temperature controller 340 acquires a temperature measurement code from the measured temperature value converter 320 and acquires a detection signal from the optical modulation amplitude detector 330. The temperature controller 340 controls a heater control code based on the temperature measurement code and the detection signal.

The temperature controller 340 transmits the heater control code to the heater controller 310 to generate a heater control voltage corresponding to the heater control code, thereby controlling the operation of the heater 214 to control the temperature of the optical modulator 210.

At the time of an initial operation of the optical modulator 210, the temperature controller 340 operates in a calibration mode. In the calibration mode, the temperature controller 340 selects a heater control voltage at which the optical modulation amplitude (OMA) has a maximum value and transmits the generated heater control code to the heater controller 310 to control the heater 214 with the selected heater control voltage.

After selecting the heater control voltage at which the optical modulation amplitude (OMA) has a maximum value, the temperature controller 340 operates in a lock mode. In the lock mode, the measured temperature value converter 320 acquires the measured temperature value from the sensor 216 of the optical modulator 210 which operates with the selected heater control voltage and outputs a reference temperature measurement code corresponding to the measured temperature value to the temperature controller 340. The temperature controller 340 may receive a measured temperature value based new temperature measurement code from the measured temperature value converter 320 at a predetermined cycle or in real time. The temperature controller 340 stores the reference temperature measurement code and controls the temperature of the optical modulator 210 after stopping the optical modulation amplitude detecting operation of the optical modulation amplitude detector 330.

The temperature controller 340 adjusts the new temperature measurement code based on the reference temperature measurement code and transmits a heater control code which is generated so as to maintain the maximum value of the optical modulation amplitude (OMA) using the adjusted temperature measurement code to the heater controller 310. Here, the heater controller 310 controls the driving of the heater 214 by the heater control voltage which is changed by the heater control code received from the temperature controller 340.

In a state in which the heater control voltage at which the optical modulation amplitude (OMA) has a maximum value is selected and the heater 214 is driven by the selected heater control voltage, after storing the reference temperature measurement code, the temperature controller 340 controls the optical modulation amplitude detecting operation of the optical modulation amplitude detector 330 to be stopped to minimize the power consumption for the temperature control of the optical modulator 210.

Referring to FIG. 3, the temperature controller 340 includes a heater code controller 342, a signal controller 344, and a signal storage unit 346.

The heater code controller 342 generates a heater control code to generate a heater control voltage. Here, the heater control code may be a control code to convert a digital signal into an analog signal.

The signal controller 344 acquires a new temperature measurement code based on a measured temperature value acquired from the sensor 216 at a predetermined cycle or in real time and adjusts the new temperature measurement code based on the reference temperature measurement code to change the heater control voltage.

The signal controller 344 combines the new temperature measurement code and the reference temperature measurement code to perform PID control and transmits the temperature measurement code which is adjusted in accordance with the PID control result to the heater code controller 340 to adjust the heater control code and change the heater control voltage.

The signal storage unit 346 receives a detection signal from the optical modulation amplitude detector 330 to store the maximum value of the optical modulation amplitude (OMA), selects a heater control voltage at which the optical modulation amplitude (OMA) has a maximum value, and stores a reference temperature measurement code corresponding to the selected heater control voltage.

Figure 4:
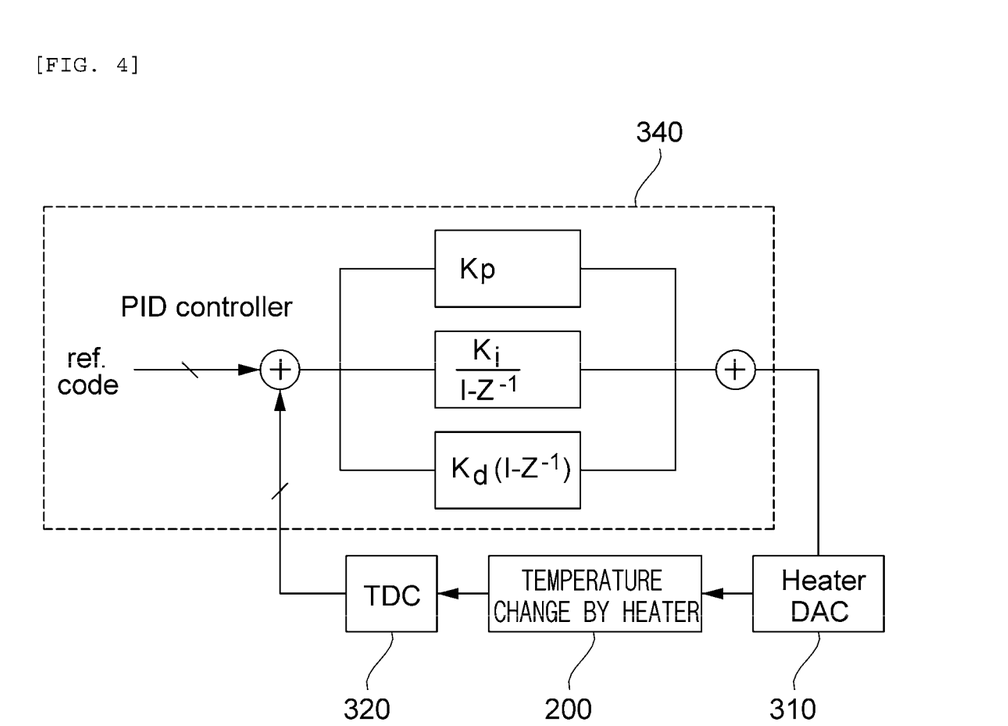
FIG. 4 is a block diagram for explaining an operation of a temperature controller according to an exemplary embodiment of the present disclosure.

FIG. 4 is a block diagram for explaining an operation of a temperature controller according to an exemplary embodiment of the present disclosure.

The temperature controller 340 of the temperature control apparatus 300 performs the PID control using a reference temperature measurement code (ref. code) driven with the heater control voltage when the optical modulation amplitude (OMA) has a maximum value.

The temperature controller 340 acquires a new temperature measurement code based on a measured temperature at a predetermined cycle or in real time and adjusts the new temperature measurement code based on the reference temperature measurement code to change the heater control voltage.

The temperature controller 340 combines the reference temperature measurement code and the new temperature measurement code, performs the PID control on the combined signal by means of a proportional-integral-differential controller, and adjusts the heater control code based on a final temperature measurement code which is adjusted in accordance with the PID control result to change the heater control voltage of the heater controller d310.

Figure 5:
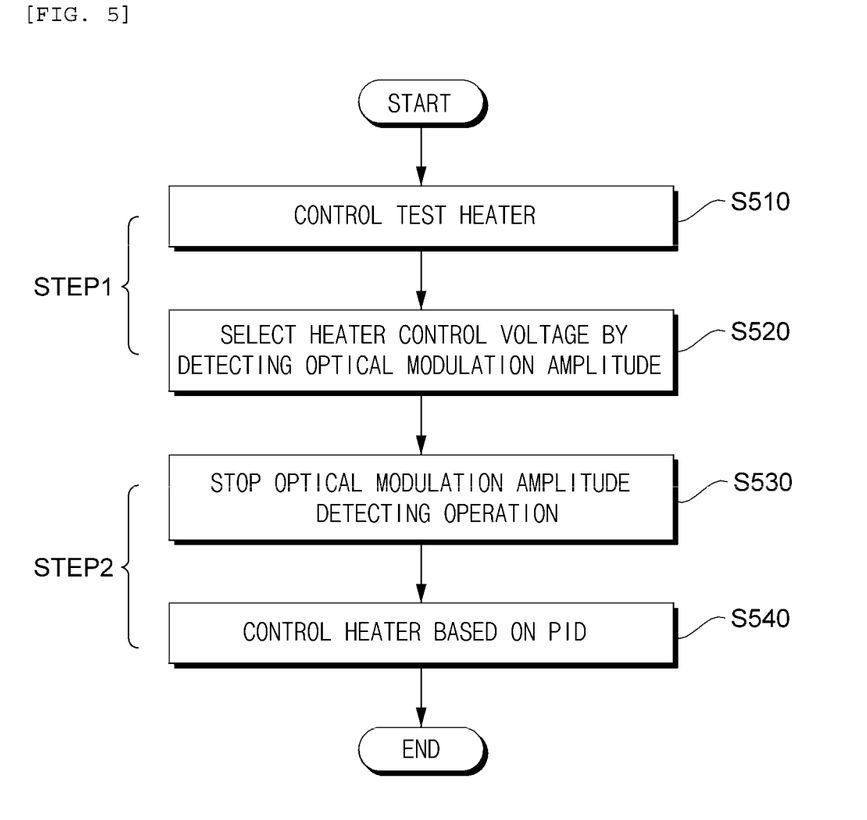
FIG. 5 is a flowchart for explaining a temperature control method of an optical modulator according to an exemplary embodiment of the present disclosure.

FIG. 5 is a flowchart for explaining a temperature control method of an optical modulator according to an exemplary embodiment of the present disclosure.

The temperature control apparatus 300 operates in a calibration mode (STEP 1) at the time of the initial operation of the optical modulator.

In the calibration mode (STEP 1), the temperature control apparatus 300 controls a test heater by adjusting the heater control voltage to be sequentially increased (S510). Here, the temperature control apparatus 300 adjusts the heater control voltage to be increased in the unit of a predetermined voltage at an initial value (0 V) of the heater control voltage.

Thereafter, the temperature control apparatus 300 selects a heater control voltage at which the optical modulation amplitude (OMA) is maximum by detecting the optical modulation amplitude (OMA) (S520). Specifically, the temperature control apparatus 300 detects the optical modulation amplitude (OMA) of the electrical signal applied by the optical modulator 210 in a state in which the heater 214 is driven by the heater control voltage. Here, the temperature control apparatus 300 selects a heater control voltage corresponding to a peak value at which the optical modulation amplitude (OMA) is maximum. When there is a plurality of heater control voltages corresponding to the peak values, the temperature control apparatus 300 may select a heater control voltage corresponding to the maximum value among the peak values, but is not limited thereto and may select a heater control voltage corresponding to a peak value which is finally detected.

When the calibration mode (STEP 1) is completed at the time of the initial operation of the optical modulator 210, the temperature control apparatus 300 operates in a lock mode (STEP 2).

In the lock mode (STEP 2), the temperature control apparatus 300 performs an operation of stopping an operation of detecting the optical modulation amplitude (OMA) after selecting the heater control voltage (S530). Specifically, the temperature control apparatus 300 drives the heater 214 with the heater control voltage selected in the calibration mode and stores the temperature measurement code based on the measured temperature value acquired from the sensor 216 of the optical modulator 210 as a reference temperature measurement code and stops the operation of detecting the optical modulation amplitude (OMA).

Thereafter, the temperature control apparatus 300 acquires the measured temperature value from the sensor 216 of the optical modulator 210 and adjusts the heater control voltage by means of the PID control to control the temperature of the optical modulator 210 (S540).

Specifically, the temperature control apparatus 300 acquires the measured temperature value from the sensor 216 of the optical modulator 210 in a state in which the operation of detecting the optical modulation amplitude (OMA) is stopped and generates a new temperature measurement code generated based on the acquired measured temperature value. Here, the temperature measurement apparatus 300 acquires the measured temperature value from the sensor 216 at a predetermined cycle or in real time.

The temperature control apparatus 300 adjusts the new temperature measurement code based on the reference temperature measurement code and changes a heater control voltage so as to maintain the maximum value of the optical modulation amplitude (OMA) using the adjusted temperature measurement code. The heater control apparatus 300 transmits the changed heater control voltage to the heater 214 to maintain a temperature of the optical modulator 210 to be constant.

Even though in FIG. 5, it is described that the steps are sequentially performed, the present invention is not necessarily limited thereto. In other words, the steps illustrated in FIG. 5 may be changed or one or more steps may be performed in parallel so that FIG. 5 is not limited to a time-series order.

Figure 6A:
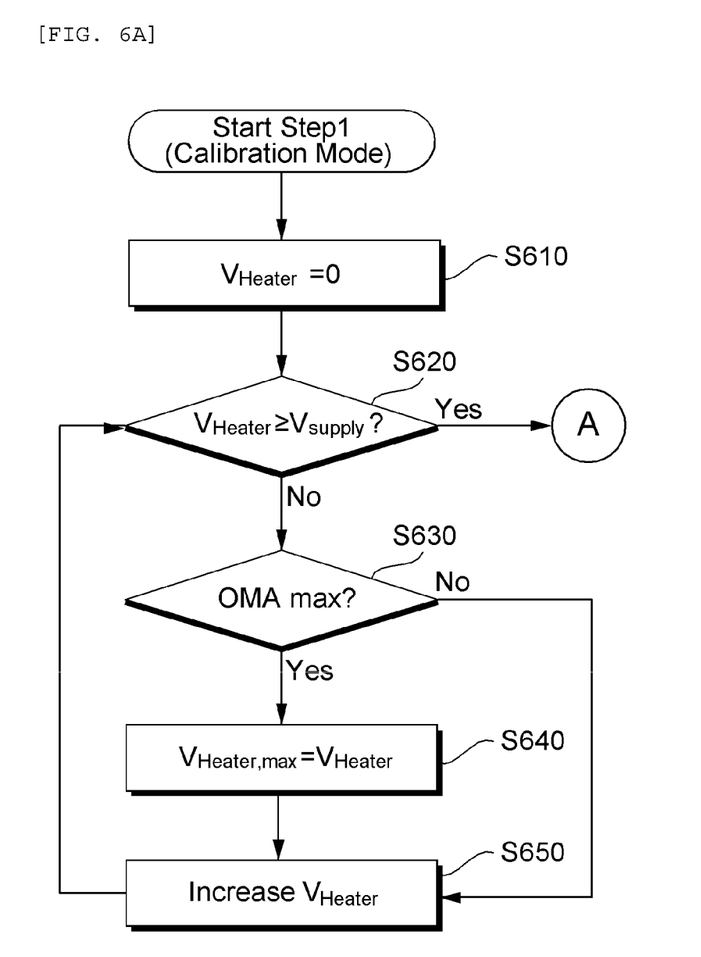
FIGS. 6A and 6B are flowcharts for explaining a temperature control method of an optical modulator in each of a calibration mode and a lock mode according to an exemplary embodiment of the present disclosure.
Figure 6B:
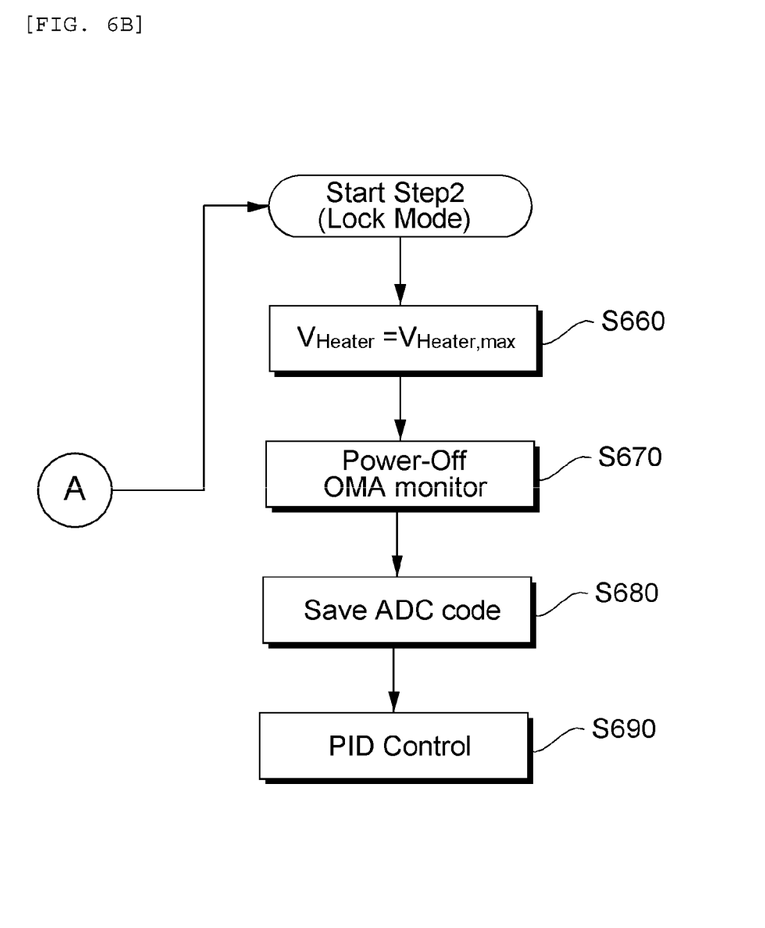

FIGS. 6A and 6B are flowcharts for explaining a temperature control method of an optical modulator in each of a correction mode and a fixing mode according to an exemplary embodiment of the present disclosure.

FIG. 6A illustrates a temperature control flowchart of the calibration mode (STEP 1) of the temperature control apparatus 300 and FIG. 6B illustrates a temperature control flowchart of the lock mode (STEP 2) of the temperature control apparatus 300.

In the calibration mode, the heater control voltage value at which the optical modulation amplitude (OMA) is maximum is found while changing the voltage of the heater.

In the lock mode, the heater is driven with the heater control voltage found in the calibration mode and the temperature measurement code (TDC value) which represents the temperature of the optical modulator is stored as a reference, and operation of the optical modulation amplitude (OMA) is stopped.

Thereafter, the temperature control apparatus 300 performs the PID control to change the voltage of the heater based on the temperature measurement code (TDC value) as the reference to maintain the maximum value of the optical modulation amplitude (OMA).

The temperature control apparatus 300 continuously maintains the temperature of the optical modulator 210 when the optical modulation amplitude (OMA) has a maximum value so that even though the outside temperature changes, the temperature in the chip may be consistently maintained. By doing this, the driving performance of the optical modulator 210 may maintain an optical operation point.

Referring to FIG. 6A, in the calibration mode, the temperature control apparatus 300 sets the heater control voltage as an initial value (0 V) (S610) and increases the heater control voltage in the unit of predetermined voltage.

The temperature control apparatus 300 compares the heater control voltage and a supplied voltage (S620). If the heater control voltage is equal to or higher than the supplied voltage, the temperature control apparatus 300 selects the heater control voltage as a heater control voltage for temperature control of the optical modulator and performs a lock mode.

In the meantime, if the heater control voltage is lower than the supplied voltage, the temperature control apparatus 300 drives the heater with the heater control voltage and detects the optical modulation amplitude (OMA) (S630).

In step S630, if the optical modulation amplitude (OMA) does not have a maximum value, the temperature control apparatus 300 increases the heater control voltage in the unit of a predetermined voltage (S650) and performs the operation of step S620 with the increased heater control voltage. Here, the temperature control apparatus 300 repeatedly performs the operation of increasing the heater control voltage until the optical modulation amplitude (OMA) has a maximum value.

In the meantime, when the optical modulation amplitude (OMA) has a maximum value in step S630, the temperature control apparatus 300 selects the heater control voltage as a candidate of the heater control voltage for temperature control of the optical modulator and increases the heater control voltage (S650), and performs the operation of step S620 with the increased heater control voltage.

If the heater control voltage selected as a candidate is equal to or higher than the supplied voltage in step S620, the temperature control apparatus 300 selects the heater control voltage as a heater control voltage for temperature control of the optical modulator and performs a lock mode. In the meantime, if the heater control voltage selected as a candidate is lower than the supplied voltage in step S620, the temperature control apparatus 300 repeatedly performs the operations of steps S620 to S650.

Referring to FIG. 6B, in the lock mode, the temperature control apparatus 300 selects the heater control voltage at which the optical modulation amplitude (OMA) has a maximum value as a heater control voltage for temperature control of the optical modulator and drives the heater 214 of the optical modulator 210 with the selected heater control voltage (S660).

The temperature control apparatus 300 stops the operation of detecting the optical modulation amplitude (OMA) and stores a temperature measurement code based on the measured temperature value acquired from the sensor 216 of the optical modulator 210 as a reference temperature measurement code (S680).

The temperature control apparatus 300 acquires the measured temperature value from the sensor 216 of the optical modulator 210 and adjusts the heater control voltage by means of the PID control to control the temperature of the optical modulator 210 (S690). Specifically, the temperature control apparatus 300 acquires the measured temperature value from the sensor 216 of the optical modulator 210 in a state in which the operation of detecting the optical modulation amplitude (OMA) is stopped and generates a new temperature measurement code generated based on the acquired measured temperature value. Here, the temperature measurement apparatus 300 acquires the measured temperature value from the sensor 216 at a predetermined cycle or in real time.

The temperature control apparatus 340 adjusts the new temperature measurement code based on the reference temperature measurement code and changes a heater control voltage so as to maintain the maximum value of the optical modulation amplitude (OMA) using the adjusted temperature measurement code. The heater control apparatus 300 transmits the changed heater control voltage to the heater 214 to maintain a temperature of the optical modulator 210 to be constant.

Even though in FIGS. 6A and 6B, it is described that the steps are sequentially executed, the present disclosure is not necessarily limited thereto. In other words, the steps described in FIGS. 6A and 6B may be modified to be executed or one or more steps may be executed in parallel so that FIGS. 6A and 6B are not limited to a time-sequential order.

Figure 7:
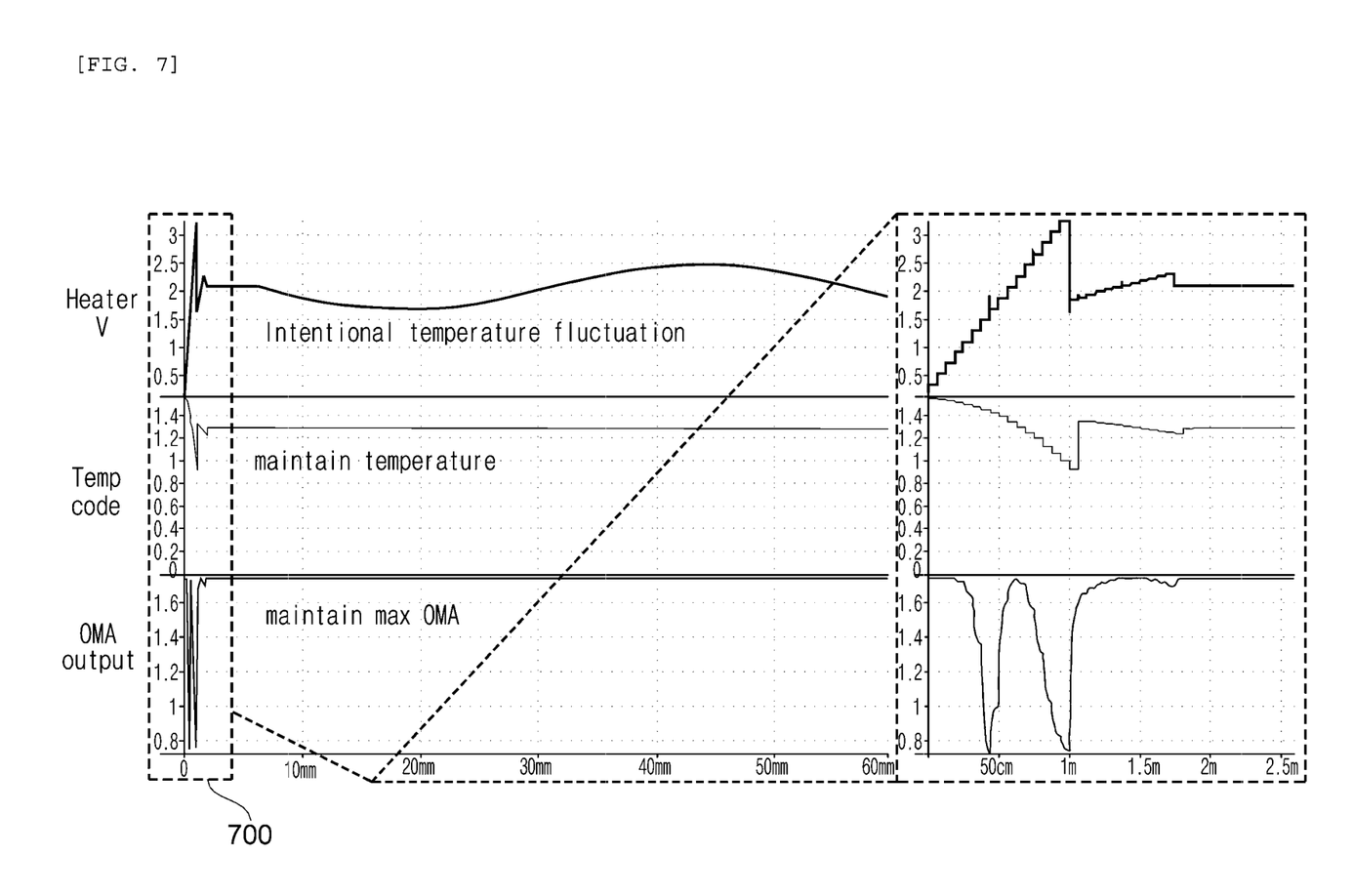
FIG. 7 is a view illustrating a measurement result of a temperature control apparatus according to an exemplary embodiment of the present disclosure.

FIG. 7 is a view illustrating a measurement result of a temperature control apparatus according to an exemplary embodiment of the present disclosure.

In FIG. 7, a part of the graph of initial sweep 700 means a section in which the calibration mode is performed and the remaining part of the graph means a section in which the lock mode is performed.

In the calibration mode, a heater control voltage at which the optical modulation amplitude is maximum is found while changing the voltage of the heater.

Thereafter, the lock mode is operated and a temperature of the optical modulator 210 is maintained by means of the PID control while continuously applying the stored heater control voltage to the heater. After maintaining the temperature, even though the temperature is intentionally changed, the temperature measurement code (TDC code) representing the temperature is not changed, but only the change of the heater is correspondingly changed.

In recent years, as necessary for high-speed data transmission is increasing, the demand for optical communication interfaces is also increasing. Accordingly, optical interfaces such as optical modulators may have marketability in accordance with the development of the silicon-photonics processes.

However, the temperature-dependent control is essential to produce and practically use optical devices. Specifically, if the temperature control apparatus 300 according to the present disclosure can be integrated with the optical modulator in a single chip using the silicon-photonics process, the degree of integration is increased, which may result in the increase of data by means of the wavelength division multiplexing (WDM) and may be applied to all kind of modulators sensitive to the temperature as well as a ring type modulator.

It will be appreciated that various exemplary embodiments of the present disclosure have been described herein for purposes of illustration, and that various modifications and changes may be made by those skilled in the art without departing from the scope and spirit of the present invention. Accordingly, the exemplary embodiments of the present disclosure are not intended to limit but describe the technical spirit of the present invention and the scope of the technical spirit of the present invention is not restricted by the exemplary embodiments. The protective scope of the exemplary embodiment of the present invention should be construed based on the following claims, and all the technical concepts in the equivalent scope thereof should be construed as falling within the scope of the exemplary embodiment of the present invention.

What is claimed is:

1. A temperature control apparatus of an optical modulator which is interlinked with a heater and a sensor included in the optical modulator, the apparatus comprising:
a heater controller which is applied with a heater control signal and outputs a heater control voltage generated based on the heater control signal to control an operation of the heater;
a measured temperature value converter which acquires a measured temperature value from the sensor and outputs a temperature measurement signal obtained by converting the measured temperature value into a digital signal;
an optical modulation amplitude detector which is applied with an electrical signal (current) for an optical signal modulated by the optical modulator and outputs a detection signal corresponding to a detection result of an optical modulator amplitude (OMA) detected based on the electrical signal; and a temperature controller which generates a heater control signal based on the temperature measurement signal and the detection signal and transmits the heater control signal to the heater controller to control the temperature of the optical modulator, wherein the temperature controller operates in a calibration mode at the time of initial operation of the optical modulator and in the calibration mode, the temperature controller selects a heater control voltage at which the optical modulation amplitude (OMA) has a maximum value and transmits a heater control signal generated to control the heater with the selected heater control voltage to the heater controller.

2. The temperature control apparatus according to claim 1, wherein the temperature controller operates in a lock mode after selecting the heater control voltage at which the optical modulation amplitude (OMA) has the maximum value, and in the lock mode, the measured temperature value converter acquires the measured temperature value from the sensor of the optical modulator driven at the selected heater voltage and outputs a reference temperature measurement signal corresponding to the measured temperature value to the temperature controller, and the temperature controller stores the reference temperature measurement signal and controls a temperature of the optical modulator after stopping an optical modulation amplitude detecting operation of the optical modulation amplitude detector.

3. The temperature control apparatus according to claim 2, wherein the temperature controller receives a new temperature measurement signal based on the measured temperature value at a predetermined cycle or in real time, from the measured temperature value converter, the temperature controller adjusts the new temperature measurement signal based on the reference temperature measurement signal and transmits a heater control signal which is generated so as to maintain the maximum value of the optical modulation amplitude (OMA) using the adjusted temperature measurement signal to the heater controller, and the heater controller controls the driving of the heater by the heater control voltage changed based on the heater control signal.

4. The temperature control apparatus according to claim 1, wherein the optical modulation amplitude detector includes:

an RMS detector which is applied with the electrical signal for the optical signal modulated by the optical modulator and detects an effective voltage proportional to an effective value of the electrical signal; and a slope detector which detects a slope based on a detection result for the effective voltage and transmits the detection signal at which the optical modulation amplitude (OMA) has the maximum value to the temperature controller.

5. The temperature control apparatus according to claim 4, wherein the temperature controller includes:

a heater code controller which generates the heater control signal to generate the heater control voltage;

a signal storage unit which receives the detection signal to store the maximum value of the optical modulation amplitude (OMA), selects the heater control voltage at which the optical modulation amplitude (OMA) has the maximum value, and stores a reference temperature measurement signal corresponding to the selected heater control voltage; and a signal controller which acquires a new temperature measurement signal based on the measured temperature value acquired from the sensor at a predetermined cycle or in real time and adjusts the new temperature measurement signal based on the reference temperature measurement signal to change the heater control voltage.

6. The temperature control apparatus according to claim 5, wherein the signal controller combines the new temperature measurement signal and the reference temperature measurement signal to perform PID control and transmits the temperature measurement signal which is adjusted in accordance with the PID control result to the heater code controller to adjust the heater control signal and change the heater control voltage.

7. The temperature control apparatus according to claim 5, wherein in a state in which the heater control voltage at which the optical modulation amplitude (OMA) has the maximum value is selected and the heater is driven at the selected heater control voltage, after storing the reference temperature measurement signal, the temperature controller controls the optical modulation amplitude detecting operation of the optical modulation amplitude detector to be stopped.

8. A temperature control method by a temperature control apparatus which is interlinked with a heater and a sensor included in an optical modulator, the method comprising:

a calibration mode performing step of detecting an optical modulation amplitude (OMA) by means of an optical modulation amplitude detecting operation by adjusting a heater control voltage in the unit of a predetermined voltage at the time of initial operation of the optical modulator to select a heater control voltage; and a lock mode performing step of storing a reference temperature measurement signal based on a measured temperature value acquired from the sensor while driving the heater with the selected heater control voltage and controlling a temperature of the optical modulator after stopping the operation of detecting the optical modulation amplitude (OMA), wherein in the calibration mode performing step, an electrical signal for an optical signal modulated by the optical modulator is applied, the optical modulation amplitude (OMA) is detected based on the electrical signal, and the heater control voltage at which the optical modulation amplitude (OMA) is maximum is selected.

9. The temperature control method according to claim 8, wherein in the calibration mode performing step, the electrical signal for the optical signal modulated by the optical modulator is applied and an effective voltage proportional to an effective value of the electrical signal is detected and a slope is detected based on a detection result for the effective voltage to select the heater control voltage based on the detection signal at which the optical modulation amplitude (OMA) has a maximum value.

10. The temperature control method according to claim 8, wherein in the lock mode performing step, the driving of the heater is controlled by receiving a new temperature measurement signal based on a measured temperature value at a predetermined cycle or in real time, adjusting the new temperature measurement signal based on the reference temperature measurement signal, and changing the heater control voltage so as to maintain the maximum value of the optical modulation amplitude (OMA) using the adjusted temperature measurement signal.

11. A temperature control system, comprising:
an optical modulation apparatus including an optical modulator, which includes a modulator which is applied with an optical source signal and a high-speed modulated electrical signal to perform modulation, a sensor which measures a temperature, and a heater which adjusts a temperature, and a photo diode which converts and outputs the optical signal modulated by the modulator into an electrical signal; and
a temperature control apparatus which selects a heater control voltage at which an optical modulation amplitude (OMA) is maximum by adjusting a heater control voltage in the unit of a predetermined voltage at the time of initial operation of the optical modulator, stores a reference temperature measurement signal based on a measured temperature value acquired from the sensor while driving the heater with the selected heater control voltage, and controls the temperature of the optical modulator after stopping the operation of detecting the optical modulation amplitude (OMA),
wherein after stopping the operation of detecting the optical modulation amplitude (OMA), the temperature control apparatus controls the driving of the heater by receiving a new temperature measurement signal based on the measured temperature value at a predetermined cycle or in real time, adjusting the new temperature measurement signal based on the reference temperature measurement signal, and changing the heater control voltage so as to maintain the maximum value of the optical modulation amplitude (OMA) using the adjusted temperature measurement signal.

* * * * *